United States Patent [19]

Usui

[11] Patent Number: 5,652,918
[45] Date of Patent: Jul. 29, 1997

[54] IMAGE BLUR SUPPRESSION DEVICE FOR AN OPTICAL CAMERA

[75] Inventor: Kazutoshi Usui, Kawasaki, Japan

[73] Assignee: Nikon Corporation, Tokyo, Japan

[21] Appl. No.: 438,510

[22] Filed: May 10, 1995

[30] Foreign Application Priority Data

May 10, 1994 [JP] Japan .................................. 6-096267

[51] Int. Cl.⁶ .................................................. G03B 17/00
[52] U.S. Cl. ........................................... 396/55; 348/208
[58] Field of Search ........................ 354/195.1, 410, 354/430, 70; 348/208

[56] References Cited

U.S. PATENT DOCUMENTS

| | | | |
|---|---|---|---|
| 4,996,545 | 2/1991 | Enomoto et al. | 354/70 |
| 5,266,988 | 11/1993 | Washisu | 354/70 |
| 5,317,394 | 5/1994 | Hale et al. | 348/208 |
| 5,450,126 | 9/1995 | Nishida | 348/208 |
| 5,479,236 | 12/1995 | Tanaka | 354/430 |

*Primary Examiner*—Safet Metjahic
*Assistant Examiner*—Eric Nelson

[57] ABSTRACT

A motion compensation device for suppressing image blur in an imaging optical system corrects for both vertical and horizontal blur using an angular velocity sensor. The angular velocity sensors detect the rotary motion in the imaging optical system, such as for a camera. An actuator generates drive power to drive the compensation optical system, electromagnetically, approximately perpendicular to the optical axis of the imaging optical system, based on the output from the angular velocity sensor, and a location detector that monitors the location of the compensation optical system. A signal monitor monitors the driving signal that drives the actuator. An optimal driving signal convertor converts the output from the angular velocity sensor to an optimal driving signal for the actuator. The driving signal of actuator is corrected based on the difference between the optimal driving signal and driving signal as monitored by signal monitor.

14 Claims, 5 Drawing Sheets

IMAGE BLUR SUPPRESSION DEVICE FOR AN OPTICAL CAMERA

BACKGROUND OF THE INVENTION

1. Field of the Invention

The present invention relates to an image blur suppression device for a camera, and in particular, relates to a motion compensation device which compensates for motion, such as vibrations, in a camera which uses a simple sensor to detect both linear and rotational motion.

2. Description of the Related Art

Known motion compensation devices move a portion of an imaging optical system (hereinafter referred to as the compensation optical system) in a direction approximately perpendicular to the optical axis of the photographic lens, to prevent blurring of an image imparted by the movement of the camera during exposure. The compensation optical system is supported by a cantilever with elastic supporting material, having a high rigidity in the direction of the optical axis. Thus, when a force is added, in a direction approximately perpendicular to the optical axis, the compensation optical system moves within a plane that is approximately perpendicular to the optical axis of the imaging optical system (also referred to as the optical system).

Such a compensation optical system is typically driven by an electromagnetic actuator that utilizes a moving coil. In addition, when a magnetic circuit is formed between a magnet, which is polarized into two poles, and, for example, a yoke, and a signal is applied to a coil located within the magnetic lines of force, a magnetic force is generated in a direction perpendicular to the direction of the current flow. The direction of the magnetic lines of force are based on Fleming's left-hand rule. Therefore, a force in the direction of the X axis or the Y axis is generated when the coil is electrified.

Figure 3:
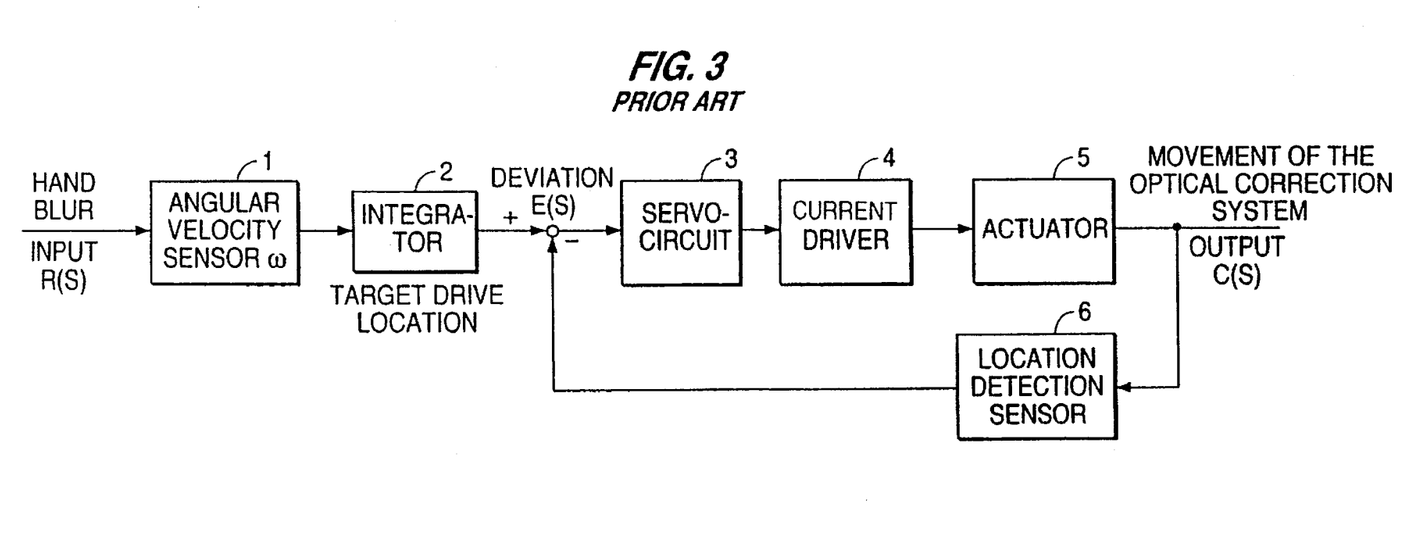
FIG. 3 is a block diagram showing a motion compensation device in accordance with the prior art.

Hand movement causes four types of blur during phototaking: pitching blur, yawing blur, vertical blur and horizontal blur. Pitching and yawing blur is caused by the camera relatively moving about the optical axis, thereby making the image move on the film. Thus, for pitching or yawing blur, it is possible to stop the movement of the image on the film through cancellation, i.e. by driving a compensation optical system. FIG. 3 shows a block diagram showing an example of a motion compensation device in accordance with the prior art for use in an optical system of a camera. An angular velocity sensor 1 monitors the pitching and yawing of the camera. The angular velocity sensor 1 comprises, for example, a piezoelectric vibrator that detects Corioli's force. The output of the angular velocity sensor 1 is connected to an integrator 2.

The integrator 2 obtains the target drive location of the compensation optical system (not shown) by integrating the output of angular velocity sensor 1 over time and converting it to a blur angle of the camera for each pitch and yaw. The movement of the compensation optical system and the blur angle of the camera are related by Equation 1-1.

$$X = f \times \theta / \alpha \qquad \text{(Equation 1-1)}$$

where:

X=movement of the compensation optical system (mm)
f=Focal distance (mm)
θ=Blur angle of the camera (rad)
α=correction constant of the compensation optical system A servo-circuit 3 compensates for the difference between the target location of the compensation optical system and the present location of the compensation optical system, by driving the compensation optical system of the camera based on the target location obtained by the integrator 2. The output of the servo-circuit 3 is connected to a signal driver 4. The signal driver 4 sends a signal corresponding to the input voltage, to a coil of an actuator 5. The actuator 5, for example, electromagnetically drives the compensation optical system, which is supported by an elastic supporting material using a cantilever and moving coil. Transmission function of such a compensation optical system against current is given by Equation 1-2.

$$X/A = \alpha / (ms^2 + cs + k) \qquad \text{(Equation 1-2)}$$

where:

X=Movement of compensation optical system
c=Viscosity coefficient
A=Coil driving current
k=Spring constant
m=Mass of movable portion
α=Driving power constant The actuator 5 moves the compensation optical system, within a plane approximately perpendicular to the optical axis of the optical system, in accordance with the current flow in the coil. A location detecting sensor 6 optically monitors the movement of the compensation optical system, and provides feedback to the servo-circuit 3.

Figure 4:
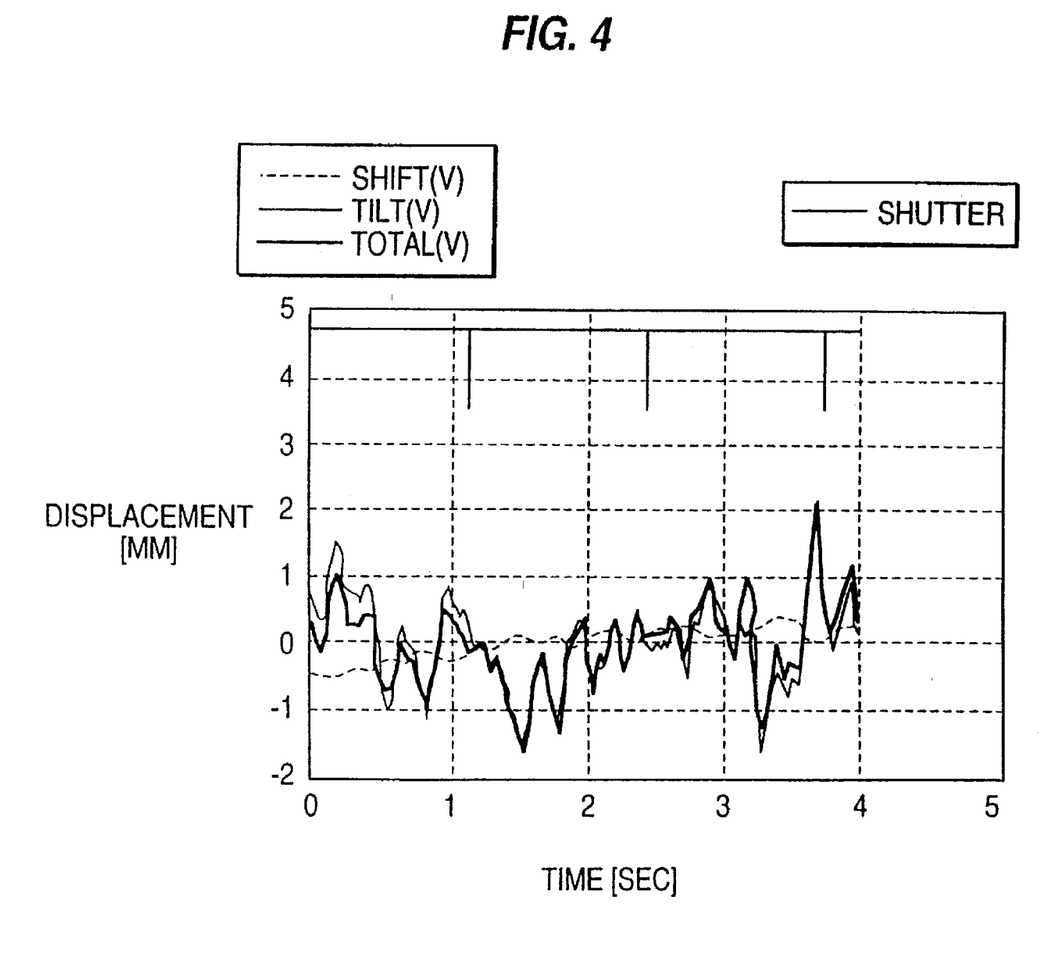
FIG. 4 is a waveform chart of vertical blur in a camera.
Figure 5:
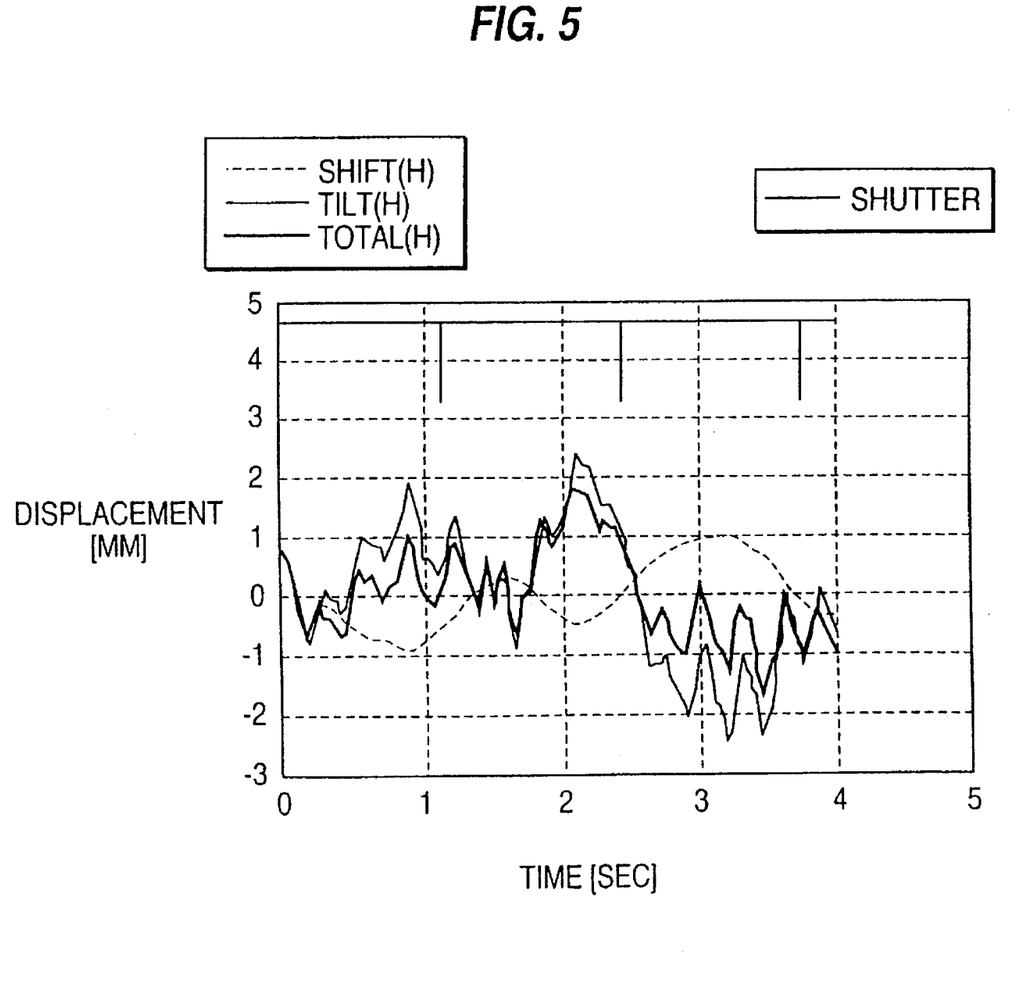
FIG. 5 is a waveform chart of horizontal blur in a camera.

FIGS. 4 and 5 are diagrams showing the waveforms of blur experienced by a camera. FIG. 4 shows blur due to vertical hand movement, while FIG. 5 shows blur due to horizontal hand movement. As described above, there are four types of blur experienced by a camera: pitching blur, yawing blur, vertical blur and horizontal blur. Pitching blur and vertical blur cause vertical blurring of the image on the film. Yawing blur and horizontal blur cause horizontal blurring of the image on the film.

As shown in FIG. 4, the amount of vertical blur (dotted line) of the camera is approximately 20% of the total blur of the image on the film in the vertical direction (bold solid line) when it is converted to the movement distance of the image on the film. As shown in FIG. 5, the amount of horizontal blur (dotted line) of the camera is approximately 30% of the blur of the image on the film in the horizontal direction (bold solid line). In addition, the amount of vertical and horizontal blur, as a portion of the entire blur, increases as the focus length of the optical system decreases and the distance to the photo subject decreases.

In accordance with the prior art, image blur due to pitching and yawing can be corrected by monitoring with angular velocity sensor 1 and driving the compensation optical system. However, vertical and horizontal blur cannot be corrected as there is no sensor to sense vibrations causing the vertical and horizontal blur. In other words, for movement of the image in the vertical direction, even though the entire pitching component can be corrected by the compensation optical system, only approximately 80% of the total blur is eliminated. In addition, for movement of the image in the horizontal direction, even though the entire yawing component can be corrected by the compensation optical system, only approximately 70% of the total blur is eliminated. Furthermore, the percentage of the entire blur that can be corrected by detecting pitching and yawing, decreases as the focusing length of the optical system and the distance to the photo subject decreases.

In order to correct vertical and horizontal blur, an expensive special sensor that detects vertical and horizontal blur, for example a G sensor, is necessary. Other problems also arise that make such a motion compensation device even more expensive.

SUMMARY OF THE INVENTION

Accordingly, it is an object of the present invention to provide a motion compensation device that compensates for vertical and horizontal blur, without requiring a special sensor.

It is another object of the invention to provide a motion compensation device in which by examining the difference between an optimal drive signal, obtained from the rotary motion detector and the actual drive signal of the drive power generator, and by driving a compensation optical system to correct for the blur that is in the direction approximately perpendicular to the optical axis, it is possible to correct for vertical and horizontal blur of the camera without having a special sensor to detect vertical and horizontal motions.

It is a further object of the present invention to provide a motion compensation device in which a DC component of the drive signal is eliminated when the drive signal is monitored, and in which shifts of a compensation optical system due to stationary forces, such as gravity, are prevented.

Additional objects and advantages of the invention will be set forth in part in the description which follows, and, in part, will be obvious from the description, or may be learned by practice of the invention.

Objects of the present invention are achieved in a motion compensation device for suppressing image blur in an imaging optical system, the motion compensation device comprising a compensation optical system, a rotary motion detector to output a signal indicative of rotary motion in the imaging optical system, a driver outputting a signal to move the compensation optical system perpendicular to an optical axis of the imaging optical system based on the signal output from said rotary motion detector, a signal monitor to monitor the signal output from the driver, an optimal drive signal calculator to output an optimal drive signal based on the signal output by the rotary motion detector, and a target drive location unit to correct the signal of the rotary motion detector input to the driver based on a difference between the signal output by the optimal drive signal calculator and the signal monitor.

Objects of the present invention are also achieved by a motion compensation device for suppressing image blur in an imaging optical system comprising a compensation optical system, and a plurality of angular velocity sensors to detect pitching and yawing of the imaging optical system, and a drive unit to shift the compensation optical system perpendicular to an optical axis of the imaging optical system in response to horizontal motion, vertical motion, pitching and yawing of the imaging optical system based on the output of the plurality of angular velocity sensors.

Objects of the present invention are further achieved by a method of compensating for motion in an imaging optical system to suppress blurring of an image produced by the optical system comprising detecting pitching and yawing of the imaging optical system, calculating an optimal driving signal based on the detected pitching and yawing of the imaging optical system, monitoring the driving signal, and driving a compensation optical system based on the detected pitching and yawing and a difference between the optimal driving signal and the driving signal as monitored.

Objects of the present invention are also achieved in a motion compensation device comprising a rotary motion detector that detects rotary motion of a camera, a compensation optical system adapted to be driven in a direction approximately perpendicular to an optical axis of the compensation optical system, a drive power generator to drive the compensation optical system, electromagnetically, based on the output from the rotary motion detector, a location detector to monitor the location of the compensation optical system, a driving signal measurement device to monitor an actual driving signal for driving the drive power generator, an optimal driving signal convertor to convert the output from the rotary motion detector to an optimal driving signal for the drive power generator, and a driving power correction device to correct the driving power for the drive power generator based on the difference between the optimal driving signal and the actual driving signal.

Objects of the present invention are also achieved in a compensation device comprising a DC-elimination filter that excludes a DC component of a driving signal that is measured by a driving signal measurement device.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
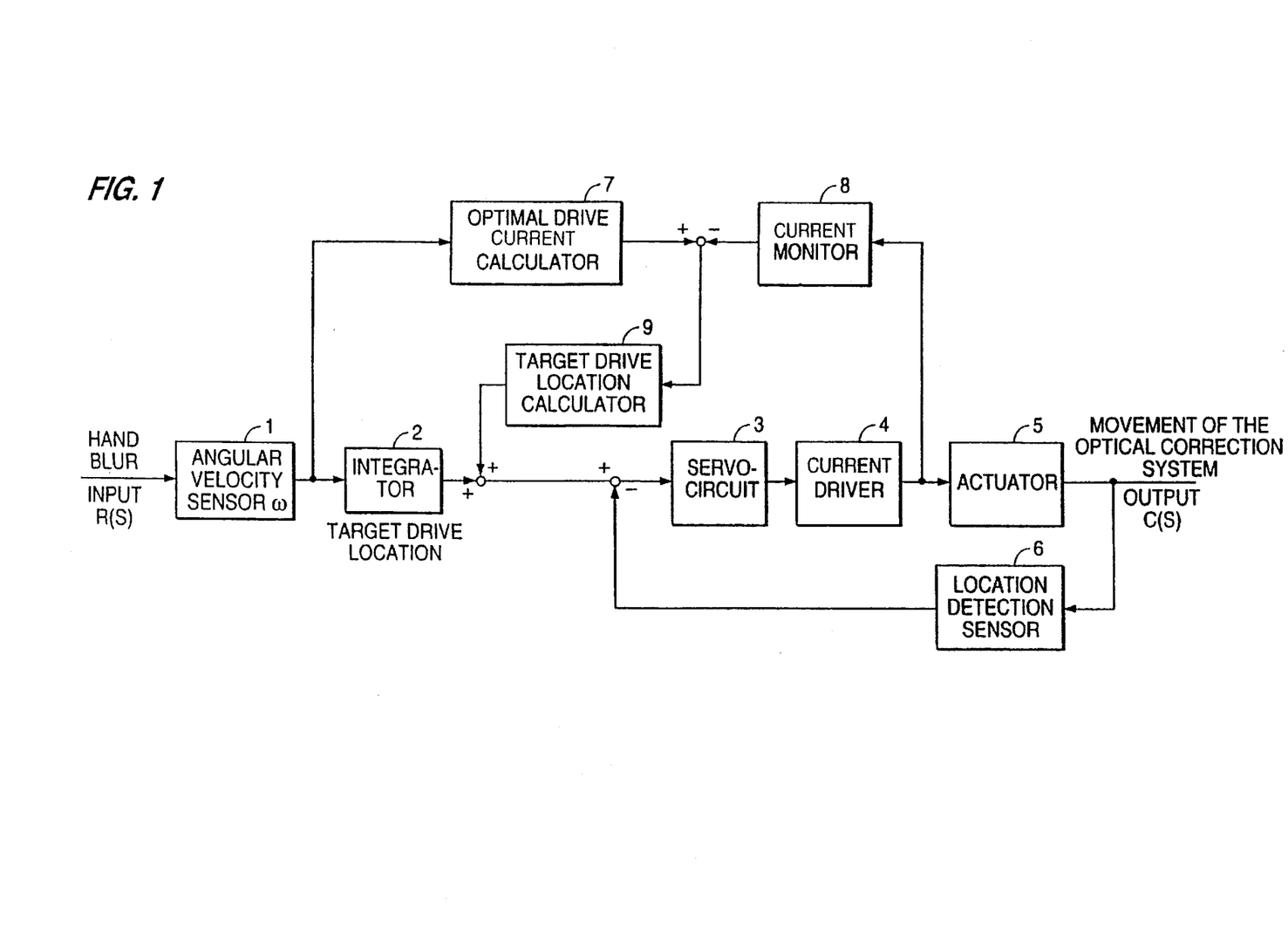
FIG. 1 is a block diagram showing a motion compensation device in accordance with a first preferred embodiment of the present invention.

FIG. 1 is a block diagram of a motion compensation device in accordance with a first preferred embodiment of the present invention. More specifically, FIG. 1 shows the structure of a motion compensation device that corrects for movement, including vibration, of an image in a vertical direction. The device is particularly suitable for use in a camera. One of ordinary skill in the art will recognize that a similar system may be provided to compensate for horizontal vibrations. The motion compensation device, in accordance with the first preferred embodiment, generally comprises an angular velocity sensor 1, an integrator 2, a servo circuit 3, a signal driver 4, an actuator 5, a location detection sensor, an optimal drive power calculator 7, a signal monitor 8 and an optimal drive location calculator 9. The output of angular velocity sensor 1 is connected to the integrator 2, and to the optimal drive signal calculator 7. The optimal drive signal calculator 7 calculates an optimal drive signal value A for the actuator 5. The actuator 5 drives a compensation optical system (not shown), such as that for a camera, based on the output of angular velocity sensor 1.

The optimal drive signal value A is expressed by Equation 2-1.

$$A = f/(\alpha \times Ka) \times \text{integral } (\omega dt) \quad \text{(Equation 2-1)}$$

where:
ω=Output of angular velocity sensor (rad/s)
f=Focal distance of lens (mm)
Ka=Drive constant of the actuator (mm/A)
α=Correction constant of compensation optical system In Equation 2-1, the correction constant α of the compensation optical system represents the distance of the movement of the image on the storage media, such as film in the camera, in proportion to the amount of movement of the compensation optical system. The drive constant Ka of the actuator 5 has a different frequency characteristic depending on the method of support of the compensation optical system.

The output of the angular velocity sensor 1 is converted to the target drive location of the compensation optical system after being integrated over time by the integrator 2. The servo circuit 3 controls the signal driver 4, to move the compensation optical system correcting for the difference between the target location and the signal location of the compensation optical system, based on the target drive location. The signal driver 4 outputs a signal, corresponding to the input voltage, to a coil of the actuator 5. The location detection sensor 6 monitors the current location of the compensation optical system based on the output of the actuator 5.

The signal monitor 8 monitors the actual drive (input) signal of actuator 5. The target drive location calculator 9 calculates a vertical blur component based on the difference between the output of signal monitor 8 and the output of the optimal drive signal calculator.7. The target drive location calculator 9 converts the vertical or horizontal blur component to a target drive location for the compensation optical system.

When the movement of the image in the vertical direction only has a pitching component, the optimal drive signal value for the actuator 5, calculated from the output of the angular velocity sensor 1, becomes equal to the drive signal value of actuator that is actually doing the driving. When there is no pitching component in the movement of the image in the vertical direction and the movement is only due to the vertical blur of the camera, i.e., the camera does not have a rotational movement, the output of the angular velocity sensor 1 becomes zero. Therefore, from Equation 2-1, the optimal drive signal of the actuator 5, which is calculated from the output of the angular velocity sensor 1, also becomes zero. The actuator 5 attempts to move by accepting the force due to the vertical blur. However, because the target drive location of actuator 5, which was obtained from the output of the angular velocity sensor 1, is zero, the servo-circuit 3 sends a signal via the signal driver 4, to prevent the actuator 5 from moving. In other words, the signal that drives the actuator 5 becomes equal to the vertical blur.

Where both a pitching and a vertical blur component are present, the difference between the optimal drive signal for the actuator 5, calculated from the output of the angular velocity sensor 1, and the actual drive signal of the actuator 5 is considered to be the component of the vertical blur, from Equation 2-1. In accordance with the first preferred embodiment of the present invention, it is possible to correct by driving the compensation optical system based on the vertical blur component. The target location of the compensation optical system that is equivalent to the vertical blur component can be found using Equation 2-2.

$$\delta x = Ka \cdot A \quad \text{(Equation 2-2)}$$

where:
δx=Target location of compensation optical system based on the vertical blur component (mm)

The target location δx of the compensation optical system, which is equivalent to the vertical blur component that is found from the calculation of Equation 2-2 is added to the target location x found by integrating the output of the angular velocity sensor 1. Thus, the actuator 5, which supports the compensation optical system, corrects for the vertical blur of the camera in addition to the pitching of the camera.

Although the first embodiment of the present invention has been described with respect to a specific configuration, it will be recognized that the first embodiment is not limited to the specific configuration. For example, in the first embodiment the actuator 5 is driven by modulating the input current, an actuator can be used that responds to changes in voltage.

Figure 2:
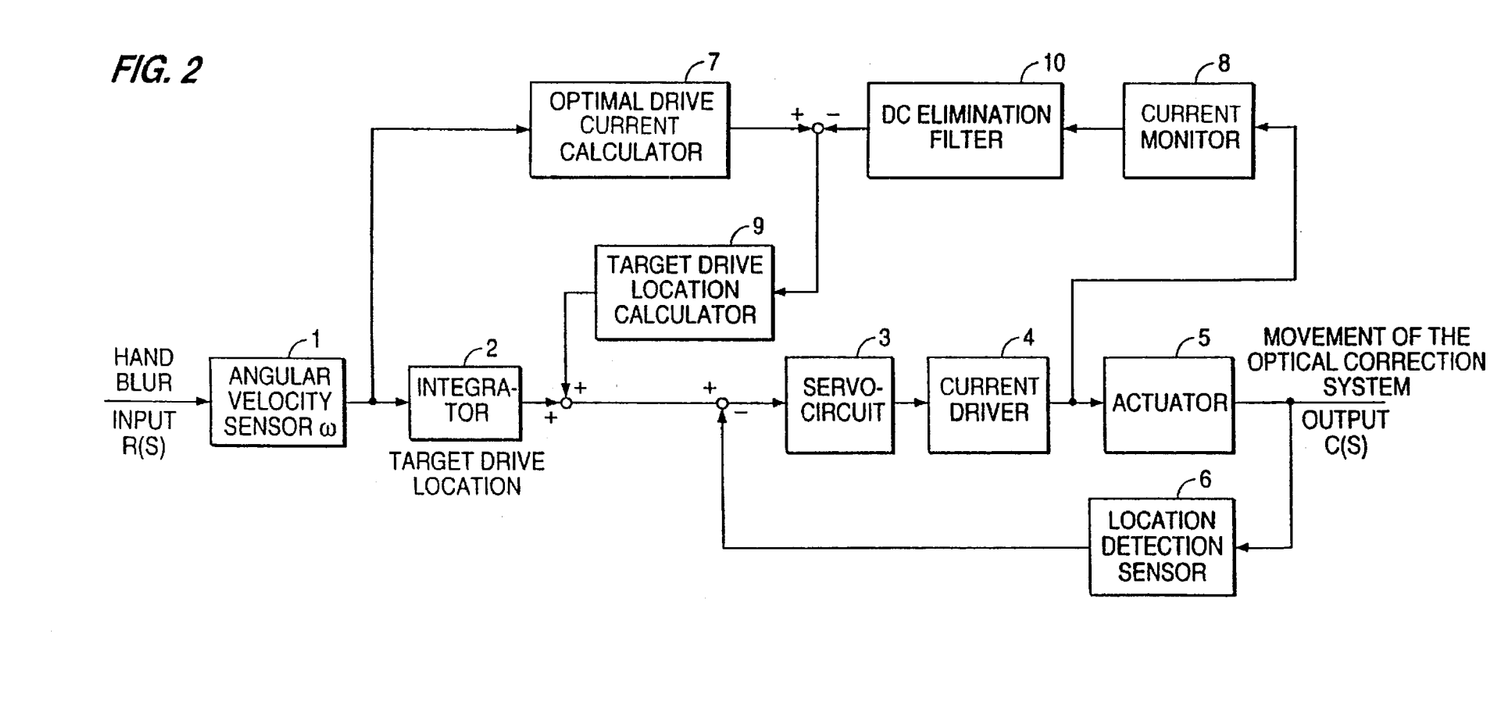
FIG. 2 is a block diagram showing a motion compensation device in accordance with a second preferred embodiment of the present invention.

FIG. 2 is a block diagram of a motion compensation device in accordance with a second preferred embodiment of the present invention. In the motion compensation device, in accordance with the first preferred embodiment, the compensation optical system was moved, to compensate for the stationary forces that are added to actuator 5. Normally, when the camera is held horizontally, gravity is added to the compensation optical system in the driving direction. When pitching blur, yawing blur, vertical blur and horizontal blur are not present, the target drive location of the compensation optical system becomes 0 and, because the signal driver 4 maintains the compensation optical system which is trying to move due to gravity, it sends a constant signal to the actuator 5. This signal value is monitored by the signal monitor 8 and compared with the optimal drive signal that is calculated from the output of angular velocity sensor 1. When pitching and yawing are not present, the optimal drive signal goes to 0 and a DC component is generated between the actuator 5 and the signal monitor 8. The DC component is converted to a target location δx based on Equation 2-2. In other words, due to the effects of gravity, the compensation optical system has a DC displacement. When a large amount of pitching blur is added to the camera, the driving of the compensation optical system due to pitching blur is conducted, in addition to the displacement due to the DC component of the compensation optical system due to gravity. When the driving amount exceeds the movable range of the compensation optical system, it becomes impossible to correct for blur.

The motion compensation device, in accordance with the second preferred embodiment, further comprises a DC elimination filter 10, for eliminating the DC component of the output of the signal monitor 8. When pitching blur, yawing blur, vertical blur and horizontal blur are not added to the camera, the optimal drive signal value of the actuator 5, which is calculated from the output of the angular velocity sensor 1, becomes 0. In addition, because the signal driver 4 centrally maintains the compensation optical system, which is trying to move due to gravity, the signal driver 4 outputs a constant signal to the actuator 5. However, the output of the signal monitor 8 passes through the DC elimination filter 10, and therefore, the output of the actuator 5 also becomes 0. Consequently, the difference between the optimal drive signal, calculated from the output of angular velocity sensor 1, and the drive signal of the actuator 5, also becomes 0. Therefore, the signal driver 4 sends a drive signal to maintain compensation optical system in the center, regardless of the effects of gravity.

In the motion compensation device, in accordance with the second preferred embodiment, when pitching blur is added to the camera, the effects of gravity are also cancelled out.

Although a few preferred embodiments of the present invention have been shown and described, it would be appreciated by those skilled in the art that changes may be made in these embodiments without departing from the principles and spirit of the invention, the scope of which is defined in the claims and their equivalents.

Specifically, because the compensation optical system is driven in a manner that corrects blur in a direction approximately perpendicular to the optical axis, based on the difference between the optimal drive signal and the output from the signal monitor 8, it is possible to correct vertical and horizontal blur of the camera without having a special sensor. Therefore, it is possible to provide a low cost motion compensation device. Further, with the use of a DC elimination filter 10, that eliminates the DC component of the drive signal detected by the signal monitor, it is possible to prevent a shift of the compensation optical system due to a stationary force, such as gravity, that is added to the drive power generator. Therefore, it is possible to prevent a decrease of the movable range due to the influence of gravity and it is possible to provide a higher quality motion compensation device.

Further, one of ordinary skill in the art will recognize that the motion compensation device in accordance with the preferred embodiments is applicable to optical systems other than for photographic cameras, for example, camcorders, telescopes, microscopes, motion picture cameras, etc.

What is claimed is:

1. A motion compensation device for suppressing image blur in an imaging optical system, the motion compensation device comprising:

a compensation optical system;

a rotary motion detector to output a signal indicative of rotary motion in the imaging optical system;

a driver outputting a signal to move said compensation optical system perpendicular to an optical axis of the imaging optical system based on the signal output from said rotary motion detector;

a signal monitor to monitor the signal output from said driver;

an optimal drive signal calculator to output an optimal drive signal based on the signal output by said rotary motion detector so as to correct for at least one of vertical and horizontal motion of the imaging optical system, the vertical motion being caused by movement of the camera in a vertical direction approximately perpendicular to the optical axis and, and the horizontal motion being caused by movement of the camera in a horizontal direction approximately perpendicular to the optical axis; and a target drive location unit to correct the signal of the rotary motion detector input to the driver based on a difference between the signal output by said optimal drive signal calculator and said signal monitor.

2. A motion compensation device as set forth in claim 1, further comprising: a DC filter to remove a DC component of the signal output by said signal monitor.

3. A motion compensation device as set forth in claim 1, wherein said rotary motion detector comprises an angular velocity sensor.

4. A motion compensation device as set forth in claim 1, wherein said compensation optical system is in a photographic lens.

5. A motion compensation device as set forth in claim 1, further comprising:

a location detection sensor to detect the location of said compensation optical system and to correct the signal output by said target drive location unit in accordance with the detected location.

6. A motion compensation device for suppressing image blur in an imaging optical system comprising:

a compensation optical system; and a plurality of angular velocity sensors to detect pitching and yawing of the imaging optical system; and a drive unit to shift said compensation optical system perpendicular to an optical axis of the imaging optical system in response to horizontal motion, vertical motion, and pitching and yawing of the imaging optical system based on the output of said plurality of angular velocity sensors, the vertical motion being caused by movement of the camera in a vertical direction approximately perpendicular to the optical axis and, and the horizontal motion being caused by movement of the camera in a horizontal direction approximately perpendicular to the optical axis.

7. A motion compensation device as set forth in claim 6, wherein said drive unit compensates for the effects of gravity on said compensation optical system.

8. A motion compensation device as set forth in claim 6, wherein said drive unit comprises:

a rotary motion detector to output a signal indicative of rotary motion in the imaging optical system;

a driver outputting a signal to move said compensation optical system perpendicular to an optical axis of the imaging optical system based on the signal output from said rotary motion detector;

a signal monitor to monitor the signal output from said driver;

an optimal drive signal calculator to output an optimal drive signal based on the signal output by said rotary motion detector; and a target drive location unit to correct the signal of the rotary motion detector input to the driver based on a difference between the signal output by said optimal drive signal calculator and said signal monitor.

9. A motion compensation device as set forth in claim 8, wherein said drive unit further comprises:

a DC filter to remove a DC component of the signal output by said signal monitor.

10. A motion compensation device as set forth in claim 8, wherein said rotary motion detector comprises an angular velocity sensor.

11. A motion compensation device as set forth in claim 6, wherein said compensation optical system is in a photographic lens.

12. A motion compensation device as set forth in claim 6, further comprising:

a location detection sensor to detect the location of said compensation optical system and to correct the signal output by said target drive location unit in accordance with the detected location.

13. A method of compensating for motion in an imaging optical system to suppress blurring of an image produced by the optical system comprising:

detecting pitching and yawing of the imaging optical system;

calculating an optimal driving signal based on the detected pitching and yawing of the imaging optical system, the optical driving signal correcting for at least one of vertical and horizontal motions of the imaging optical system, the vertical motion being caused by movement of the camera in a vertical direction approximately perpendicular to the optical axis and, and the horizontal motion being caused by movement of the camera in a horizontal direction approximately perpendicular to the optical axis;

monitoring the driving signal; and driving a compensation optical system based on the detected pitching and yawing and a difference between the optimal driving signal and the driving signal as monitored.

14. A method of compensating for motion in an imaging optical system as set forth in claim 13, wherein the step of monitoring the driving signal further comprises removing a DC component of the driving signal.

* * * * *